(12) United States Patent
Lighty et al.

(10) Patent No.: US 12,264,630 B2
(45) Date of Patent: Apr. 1, 2025

(54) COMPLIANT JOINT FOR SEALING INTERFACE BETWEEN GAS TURBINE ENGINE COMPONENTS

(71) Applicant: Rolls-Royce North American Technologies Inc., Indianapolis, IN (US)

(72) Inventors: Kerry J. Lighty, Plainfield, IN (US); William Williamson, Indianapolis, IN (US); David Templin, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/228,260

(22) Filed: Jul. 31, 2023

(65) Prior Publication Data

US 2025/0043729 A1 Feb. 6, 2025

(51) Int. Cl.
*F02C 7/28* (2006.01)
*F02C 7/18* (2006.01)

(52) U.S. Cl.
CPC ............... *F02C 7/28* (2013.01); *F02C 7/18* (2013.01); *F05D 2220/32* (2013.01); *F05D 2240/55* (2013.01); *F05D 2260/213* (2013.01)

(58) Field of Classification Search
CPC ........... F05D 2260/213; F05D 2240/57; F05D 2240/55; F05D 2220/32; F01D 25/14; F02C 7/28
See application file for complete search history.

(56) References Cited

U.S. PATENT DOCUMENTS

| | | |
|---|---|---|
| 4,203,566 A | 5/1980 | Lord |
| 8,157,503 B2 | 4/2012 | Junod |
| 8,171,986 B2 | 5/2012 | Klein |
| 9,587,561 B2 | 3/2017 | Snyder et al. |
| 9,797,271 B2 | 10/2017 | Brown |
| 10,094,286 B2 | 10/2018 | Forcier |
| 11,162,417 B2 | 11/2021 | Qui et al. |
| 2009/0212504 A1* | 8/2009 | Chila ............... F01D 11/005 277/628 |
| 2018/0030844 A1* | 2/2018 | White ............... F16J 15/0887 |
| 2023/0094510 A1* | 3/2023 | Fujiwara ............ F01D 9/023 60/752 |

\* cited by examiner

*Primary Examiner* — Todd E Manahan
*Assistant Examiner* — Rodolphe Andre Chabreyrie
(74) *Attorney, Agent, or Firm* — Barnes & Thornburg LLP

(57) ABSTRACT

A gas turbine engine includes a bypass duct, an inlet cowl, and a heat-exchanger assembly. The bypass duct is configured to direct air through a flow path to provide thrust to propel the gas turbine engine. The inlet cowl is located in the bypass duct and configured to collect a portion of the air flowing in the bypass duct. The heat-exchanger assembly is removably coupled with the inlet cowl and configured to receive the portion of the air from the inlet cowl.

20 Claims, 3 Drawing Sheets

COMPLIANT JOINT FOR SEALING INTERFACE BETWEEN GAS TURBINE ENGINE COMPONENTS

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to gas turbine engines, and more specifically to heat-exchanger assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Gas turbine engines also typically include a bypass duct arranged around the engine core. A fan included in the gas turbine engine forces air through the bypass duct and out of an aft end of the gas turbine engine to provide thrust to propel an aircraft. The bypass duct may include components configured to transfer heat between cooling fluids and the air flowing through the bypass duct. Some bypass duct designs must be wholly disassembled and reassembled to reach components within the bypass duct which may be labor and time intensive.

SUMMARY

The present disclosure may comprise one or more of the following features and combinations thereof.

A gas turbine engine may comprise a bypass duct, an inlet cowl, and a heat-exchanger assembly. The bypass duct may be configured to direct air through a flow path to provide thrust to propel the gas turbine engine. The bypass duct may include an outer wall that defines an outer boundary of the flow path and an inner wall that defines an inner boundary of the flow path. The inlet cowl may be located in the bypass duct and may be configured to collect a portion of the air flowing in the bypass duct. The inlet cowl may extend between a forward end thereof and an aft end thereof. The inlet cowl may be formed to define an inlet at the forward end and an outlet at the aft end.

In some embodiments, the heat-exchanger assembly may be removably coupled with the inlet cowl and may be configured to receive the portion of the air from the outlet of the inlet cowl and to transfer heat from the heat-exchanger assembly to the portion of the air to cool a fluid within the heat-exchanger assembly. The heat-exchanger assembly may include a heat exchanger and an inlet shroud coupled with the heat exchanger and engaged with the inlet cowl to direct the portion of the air through the heat exchanger. The inlet shroud may include a shroud housing arranged around the heat exchanger and a compliant joint coupled with the shroud housing and engaged with the inlet cowl along the outlet of the inlet cowl to provide a seal between the inlet cowl and the heat-exchanger assembly.

In some embodiments, the compliant joint may have a continuous band and a plurality of deflectable tabs that are formed by a plurality of slots that extend into the compliant joint toward the continuous band. The plurality of deflectable tabs may be configured to elastically deform in response to sliding the compliant joint onto and off of the inlet cowl to allow the heat-exchanger assembly to be separated from the inlet cowl and removed from the bypass duct.

In some embodiments, the compliant joint may be formed to include a protrusion on each of the plurality of deflectable tabs and a flared portion coupled to the protrusion on each of the plurality of deflectable tabs and located opposite the continuous band. The protrusion may extend inwardly toward the flow path and the inlet cowl. The flared portion may extend outwardly from the protrusion away from the flow path and the inlet cowl. The protrusion on each of the plurality of deflectable tabs may contact the inlet cowl to provide the seal between the inlet cowl and the heat-exchanger assembly.

In some embodiments, the inlet cowl may include a first side wall, a second side wall spaced apart circumferentially from the first side wall, and an outer wall that extends circumferentially between and interconnects the first side wall and the second side wall. The compliant joint may extend around the first side wall, the second side wall, and the outer wall of the inlet cowl. The protrusion on each of the plurality of deflectable tabs may contact the first side wall, the second side wall, and the outer wall. A gap may be formed between the inlet cowl and the flared portion on each of the plurality of deflectable tabs of the compliant joint.

In some embodiments, the continuous band of the compliant joint may be fixed to the shroud housing. The compliant joint of the inlet shroud may be located around an exterior of the inlet cowl. The shroud housing of the inlet shroud may include a first side wall, a second side wall spaced apart circumferentially from the first side wall, and an outer wall that extends circumferentially between and interconnects the first side wall and the second side wall. The continuous band of the compliant joint may extend around the first side wall, the second side wall, and the outer wall of the shroud housing.

In some embodiments, the plurality of slots may be formed in spaced apart relation along an entirety of the compliant joint. Each of the plurality of slots may have a length that is substantially similar to a length of the other slots of the plurality of slots.

In some embodiments, the heat-exchanger assembly may further include an access panel removably coupled with the outer wall of the bypass duct. The heat exchanger and inlet shroud may be coupled with the access panel for movement therewith. The inlet cowl may be coupled to the outer wall of the bypass duct. The compliant joint may be at least one of brazed and welded to the shroud housing. The inlet shroud may be made of metallic materials and a thickness of the metallic materials of the compliant joint may be less than a thickness of the metallic materials of the shroud housing.

According to another aspect of the present disclosure, a gas turbine engine may comprise a first component and a second component. The first component may be configured to collect a flow of air. The first component may extend between a first end thereof and a second end thereof. The first component may be formed to define an inlet at the first end and an outlet at the second end. The second component may be removably coupled with the first component and may be configured to receive the flow of air from the outlet of the first component. The second component may include a shroud housing configured to direct the flow of air through the second component and a compliant joint coupled with the shroud housing and engaged with the first component along the outlet of the first component to provide a seal between the first component and the second component. The compliant joint may have a continuous band and a plurality of deflectable tabs that are formed by a plurality of slots that extend into the compliant joint toward the continuous band. The plurality of deflectable tabs may be configured to elastically deform in response to sliding the compliant joint into engagement with the outlet of the first component.

In some embodiments, the continuous band of the compliant joint may be coupled to the shroud housing. The compliant joint may include a protrusion formed on each of the plurality of deflectable tabs and a flared portion coupled to the protrusion on each of the plurality of deflectable tabs. The protrusion on each of the plurality of deflectable tabs may extend inwardly toward the first component and the flared portion on each of the plurality of deflectable tabs may extend outwardly from the protrusion away from the first component. The protrusion on each of the plurality of deflectable tabs may contact the first component to provide the seal between the first component and the second component.

In some embodiments, the first component may include a first side wall, a second side wall spaced apart circumferentially from the first side wall, and an outer wall that extends circumferentially between and interconnects the first side wall and the second side wall. The compliant joint may extend around the first side wall, the second side wall, and the outer wall of the first component. The protrusion on each of the plurality of deflectable tabs may contact the first side wall, the second side wall, and the outer wall of the first component. A gap may be formed between the first component and the flared portion on each of the plurality of deflectable tabs of the compliant joint.

A method may comprise providing a bypass duct. The bypass duct may include an outer wall that defines an outer boundary of a flow path and an inner wall that defines an inner boundary of the flow path. The method may comprise arranging an inlet cowl in the bypass duct. The inlet cowl may extend between a forward end thereof and an aft end thereof. The inlet cowl may be formed to define an inlet at the forward end and an outlet at the aft end. The method may comprise moving a heat-exchanger assembly into engagement with the inlet cowl. The heat-exchanger assembly may include a heat exchanger and an inlet shroud. The inlet shroud may include a shroud housing arranged around the heat exchanger and a compliant joint coupled with the shroud housing. The moving the heat-exchanger assembly into engagement with the inlet cowl may cause the compliant joint to deflect around the inlet cowl and form a seal between the outlet of the inlet cowl and the compliant joint of the inlet shroud of the heat-exchanger assembly.

The method may include moving the heat-exchanger assembly away from the inlet cowl to separate the heat-exchanger assembly from the inlet cowl. The compliant joint may include a continuous band and a plurality of deflectable tabs that are formed by a plurality of slots that extend into the compliant joint toward the continuous band. The moving the heat-exchanger assembly step may include sliding the inlet shroud onto the inlet cowl so that the compliant joint contacts the outlet of the inlet cowl and deforming the plurality of deflectable tabs of the compliant joint.

These and other features of the present disclosure will become more apparent from the following description of the illustrative embodiments.

DETAILED DESCRIPTION OF THE DRAWINGS

Figure 1:
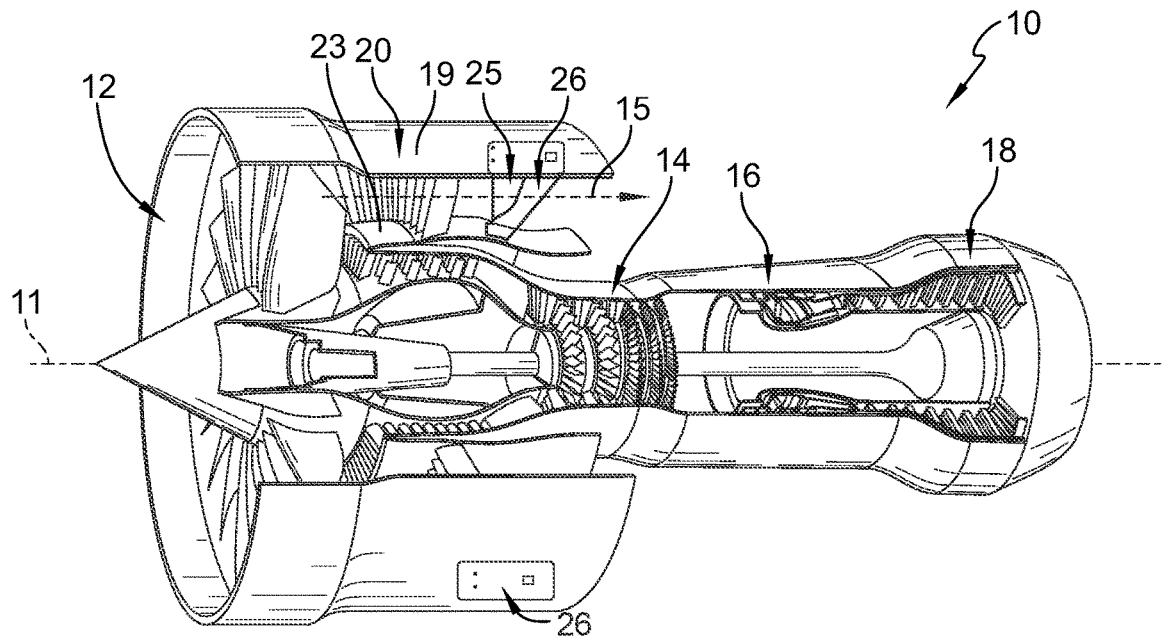
FIG. 1 is a cutaway view of a gas turbine engine that includes an engine core having a compressor, a combustor downstream of the compressor, and a turbine downstream of the combustor, and further including a fan driven by the engine core, a bypass duct arranged around the fan and the engine core, and an inlet cowl and a heat-exchanger assembly located in the bypass duct.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan assembly 12, a compressor 14, a combustor 16 located downstream of the compressor 14, and a turbine 18 located downstream of the combustor 16 as shown in FIG. 1. The fan assembly 12 is driven by the turbine 18 and provides thrust for propelling the gas turbine engine 10 by forcing air 15 through a bypass duct 20. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan assembly 12.

The fan assembly 12 rotates about the central axis 11 to force the air 15 through a flow path 24 such that the air 15 is directed through the bypass duct 20 to provide thrust to propel the gas turbine engine 10. The air 15 is ambient air and has a temperature that is less than hot, high-pressure products of the combustion reaction experienced by the combustor 16 and turbine 18. As such, a portion of the air 15 is used as a cold sink source in the present disclosure and used to cool oil, fuel, water, refrigerant, etc. for cooling the turbine 18 and/or other components such as electronics, motors, generators, etc.

Figure 2:
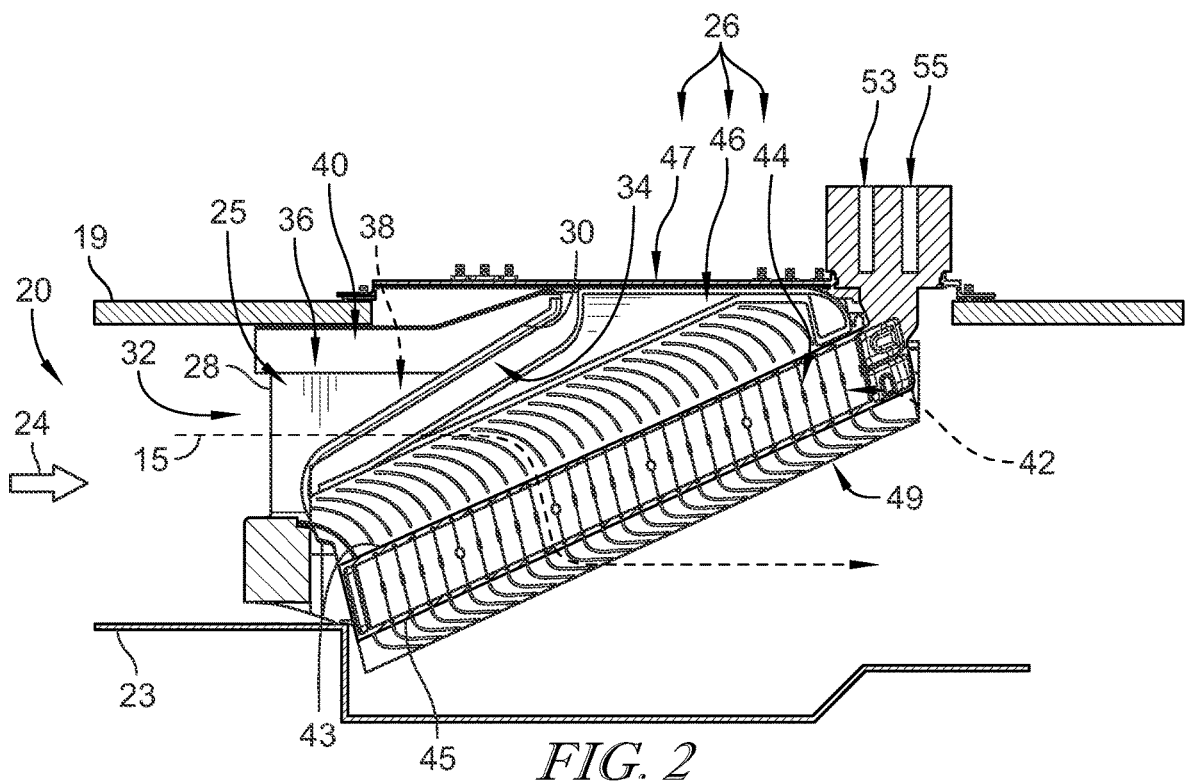
FIG. 2 is a section view of the bypass duct of the gas turbine engine of FIG. 1, showing the inlet cowl and the heat-exchanger assembly are arranged in the bypass duct, and the heat-exchanger assembly is removably coupled to the inlet cowl and includes an inlet shroud having a plurality of inlet turning vanes, a heat exchanger coupled to the inlet shroud downstream of the inlet shroud, and an outlet shroud having a plurality of outlet vanes whereby the inlet vanes and the outlet vanes help direct a flow of air through the heat exchanger while minimizing flow separation and pressure loss.

The bypass duct 20 is arranged circumferentially around the central axis 11 and includes an outer wall 19 and an inner wall 23 as shown in FIGS. 1 and 2. The outer wall 19 defines a radially outer boundary of the flow path 24 of the bypass duct 20. The inner wall 23 defines a radially inner boundary of the flow path 24 of the bypass duct 20. As a result, an entirety of the air 15 in the bypass duct 20 providing thrust for the engine 10 flows through the flow path 24 between the outer wall 19 and the inner wall 23.

In the illustrative embodiment, the gas turbine engine 10 further includes an inlet cowl 25 and a heat-exchanger assembly 26 as shown in FIG. 2. The inlet cowl 25 is arranged in the bypass duct 20. The heat-exchanger assembly 26 is coupled to the inlet cowl 25 and arranged in the bypass duct 20 downstream of the inlet cowl 25.

The inlet cowl 25 is configured to collect a portion of the air 15 flowing in the bypass duct 20 as shown in FIG. 2. The inlet cowl 25 extends between a forward end 28 and an aft end 30. The forward end 28 of the inlet cowl 25 defines an inlet 32 that receives the portion of the air 15. The aft end 30 of the inlet cowl 25 defines an outlet 34 from which the portion of the air 15 exits. The aft end 30 of the inlet cowl 25 is coupled to the heat-exchanger assembly 26. The portion of the air 15 exits the outlet 34 of the inlet cowl 25 to enter the heat-exchanger assembly 26.

The portion of the air 15 passes through the heat-exchanger assembly 26 while the majority of the air 15 flows around the inlet cowl 25 and heat-exchanger assembly 26, and the heat-exchanger assembly 26 transfers heat from a fluid 42 passing through the heat-exchanger assembly 26 to the air 15. The fluid 42 may be for example, oil, fuel, water, refrigerant, etc. The gas turbine engine 10 includes a plurality of inlet cowls 25 and heat-exchanger assemblies 26 spaced apart from one another circumferentially as suggested in FIG. 1. As such, each inlet cowl 25 and each heat-exchanger assembly 26 is discrete axially and circumferentially and does not extend fully around the central axis 11. In other embodiments, the gas turbine engine 10 may include a single inlet cowl 25 and a single heat-exchanger assembly 26.

The inlet cowl 25 includes a first side wall 36, a second side wall 38 spaced apart circumferentially from the first side wall 36, and an outer wall 40 as shown in FIG. 2. The outer wall 40 extends circumferentially between and interconnects the first side wall 36 and the second side wall 38. A portion of the outer wall 40 adjacent the forward end 28 of the inlet cowl 25 is coupled to the outer wall 19 of the bypass duct 20.

The heat-exchanger assembly 26 is removably coupled with the inlet cowl 25 as suggested in FIG. 2. The heat-exchanger assembly 26 is configured to receive the portion of the air 15 from the outlet 34 of the inlet cowl 25. The heat-exchanger assembly 26 includes, among other things, a heat exchanger 44, an inlet shroud 46, an access panel 47, and an outlet shroud 49 as shown in FIG. 2. The heat exchanger 44 is configured to receive the portion of the air 15 flowing through the bypass duct 20 and transfer heat from the heat-exchanger assembly 26 to the air 15 to cool the fluid 42 within the heat exchanger 44. The inlet shroud 46 varies a direction of the air 15 to flow into the heat exchanger 44 at a desired angle and improve uniformity of pressure and speed of the air entering the heat exchanger 44. The access panel 47 is removably coupled with the outer wall 19 of the bypass duct 20. The outlet shroud 49 varies a direction of the air 15 exiting the heat exchanger 44 to redirect the air 15 primarily in the axially aft direction.

The heat exchanger 44 is coupled to the inlet shroud 46 downstream of the inlet shroud 46 as shown in FIG. 2. The heat exchanger 44 includes a first wall 43 and a second wall 45 as shown in FIG. 2. The second wall 45 is spaced apart from and opposite the first wall 43. The first wall 43 is coupled with the inlet shroud 46 and the second wall 45 is coupled with the outlet shroud 49. The heat exchanger 44 includes a flow path located between the first wall 43 and the second wall 45. In the illustrative embodiment, the fluid 42 flows into an inlet 53 through the outer wall 19, into the flow path axially forward, turns and returns axially aft to an outlet 55 through the outer wall 19. In other embodiments, alternative inlet, outlet, and flow paths may be used.

The heat exchanger 44 is arranged in the bypass duct 20 at an angle relative to the central axis 11 as shown in FIG. 2. The heat exchanger 44 extends radially inward and axially forward from the outer wall 19. The heat exchanger 44 extends radially entirely between the outer wall 19 and the inner wall 23 such that the bypass duct 20 is blocked radially by the heat exchanger 44, though it will be understood the another portion of the air 15 not flowing through the inlet cowl 25 and the heat-exchanger assembly 26 flows around sides of the inlet cowl 25 and the heat-exchanger assembly 26.

Figure 3:
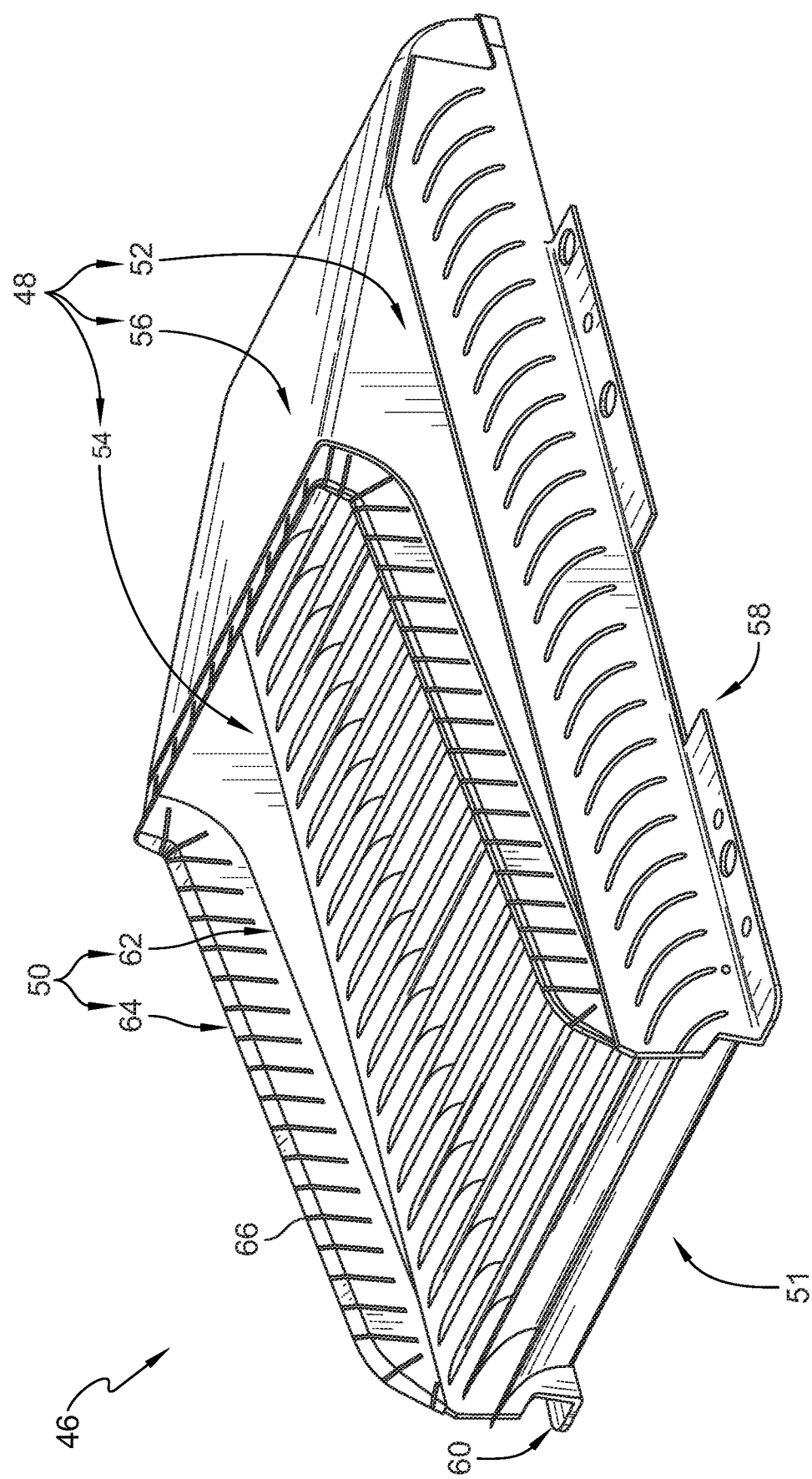
FIG. 3 is a perspective view of the inlet shroud of FIG. 2, showing the inlet shroud includes a shroud housing and a compliant joint coupled along a perimeter of the shroud housing, and the compliant joint includes a continuous band and a plurality of deflectable tabs formed by a plurality of slots that extend into the compliant joint toward the continuous band.

The inlet shroud 46 of the heat-exchanger assembly 26 includes a shroud housing 48, a compliant joint 50, and a plurality of inlet turning vanes 51 as shown in FIG. 3. The inlet shroud 46 is coupled with the heat exchanger 44 and engaged with the outlet 34 of the inlet cowl 25 to direct the portion of the air 15 through the heat exchanger 44. The plurality of inlet turning vanes 51 are located within the shroud housing 48 and are configured to adjust a direction of the portion of the air 15 entering the heat exchanger 44. The plurality of inlet turning vanes 51 turn the portion of air 15 by adjusting a direction of the flow of the air 15 such that the air 15 enters the heat exchanger 44 in a direction normal to the first wall 43 of the heat exchanger 44 in the illustrative embodiment.

The access panel 47 of the heat-exchanger assembly 26 is removably coupled with the outer wall 19 of the bypass duct 20 as shown in FIG. 2. The heat exchanger 44 and the inlet shroud 46 are coupled with the access panel 47 for movement therewith. In some embodiments, the heat-exchanger assembly 26 is fixed with the outer wall 19.

Components within the bypass duct 20 of the gas turbine engine 10 may need to be accessed, removed, and/or replaced. Conventional bypass ducts may need to be wholly disassembled and reassembled to reach components within the bypass duct. The present disclosure provides a removable heat-exchanger assembly 26, thereby allowing the components located in the bypass duct 20, such as the inlet shroud 46 and/or the heat exchanger 44 to be accessed, removed, and/or replaced without dissembling the entire bypass duct 20. The access panel 47 of the heat-exchanger assembly 26 can be removed from the outer wall 19 of the bypass duct 20, thus allowing the heat exchanger 44 and the inlet shroud 46 to be accessed and/or removed from the bypass duct 20 as well.

Additionally, the inlet shroud 46 of the heat-exchanger assembly 26 allows for blind installation as the compliant joint 50 of the inlet shroud 46 can slide onto and into engagement with the inlet cowl 25. The compliant joint 50 of the inlet shroud 46 contacts the inlet cowl 25 so as to seal between the inlet cowl 25 and the heat-exchanger assembly 26. Additionally, the compliant joint 50 may be used to seal between any other suitable components of the gas turbine engine 10. For simplicity, the compliant joint 50 is described and shown only in use with the inlet cowl 25 and the heat-exchanger assembly 26.

Turning back to the inlet shroud 46, the inlet shroud 46 includes the shroud housing 48, the compliant joint 50, and the plurality of inlet turning vanes 51 as shown in FIG. 3. The shroud housing 48 is arranged around and coupled to the heat exchanger 44. The compliant joint 50 is engaged with the aft end 30 of the inlet cowl 25 along the outlet 34. The inlet shroud 46 is made of metallic materials. The plurality of inlet turning vanes 51 are configured to adjust a direction of the portion of the air 15 entering the heat exchanger 44.

The shroud housing 48 of the inlet shroud 46 includes a first side wall 52, a second side wall 54, and an outer wall 56 as shown in FIG. 3. The first side wall 52 and the second side wall 54 are substantially parallel to one another. The second side wall 54 is spaced apart circumferentially from the first side wall 52. The outer wall 56 extends circumferentially between and interconnects the first side wall 52 and the second side wall 54. The shroud housing 48 is made of metallic materials having a first thickness T1.

The shroud housing 48 further includes a first flange 58 and a second flange 60 shown in FIG. 3. The first flange 58 extends outwardly away from the first side wall 52. In the illustrative embodiment, the first side wall 52 and the first flange 58 are substantially perpendicular to each other. The second flange 60 extends outwardly away from the second side wall 54. In the illustrative embodiment, the second side wall 54 and the second flange 60 are substantially perpendicular to each other. The first flange 58 and the second flange 60 of the shroud housing 48 are coupled to the first wall 43 of the heat exchanger 44.

Figure 4:
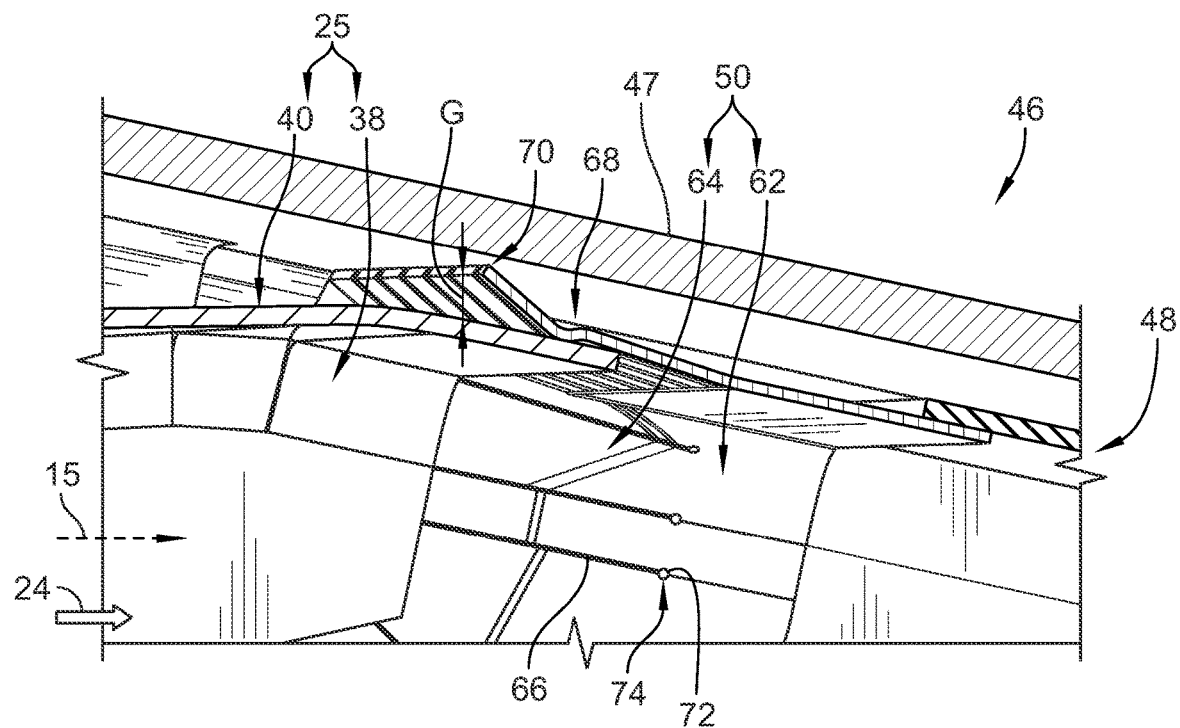
FIG. 4 is an enlarged perspective view of the inlet shroud of FIG. 3 coupled with the inlet cowl of FIG. 2, showing the compliant joint of the inlet shroud is located around an exterior of the inlet cowl, the compliant joint is formed to include a protrusion on each of the plurality of deflectable tabs and a flared portion is coupled to the protrusion on each of the plurality of deflectable tabs, and the protrusion on each of the plurality of delectable tabs contacts the inlet cowl to provide a compliant seal between the inlet cowl and the heat-exchanger assembly.

The compliant joint 50 includes a continuous band 62 and a plurality of deflectable tabs 64 as shown in FIGS. 3 and 4. The compliant joint 50 is coupled with the shroud housing 48 and engaged with the inlet cowl 25 along the outlet 34 of the inlet cowl 25 to provide the seal between the inlet cowl 25 and the heat-exchanger assembly 26 as shown in FIG. 4. The compliant joint 50 extends along a perimeter edge of the shroud housing 48 in the illustrative embodiment.

Figure 5:
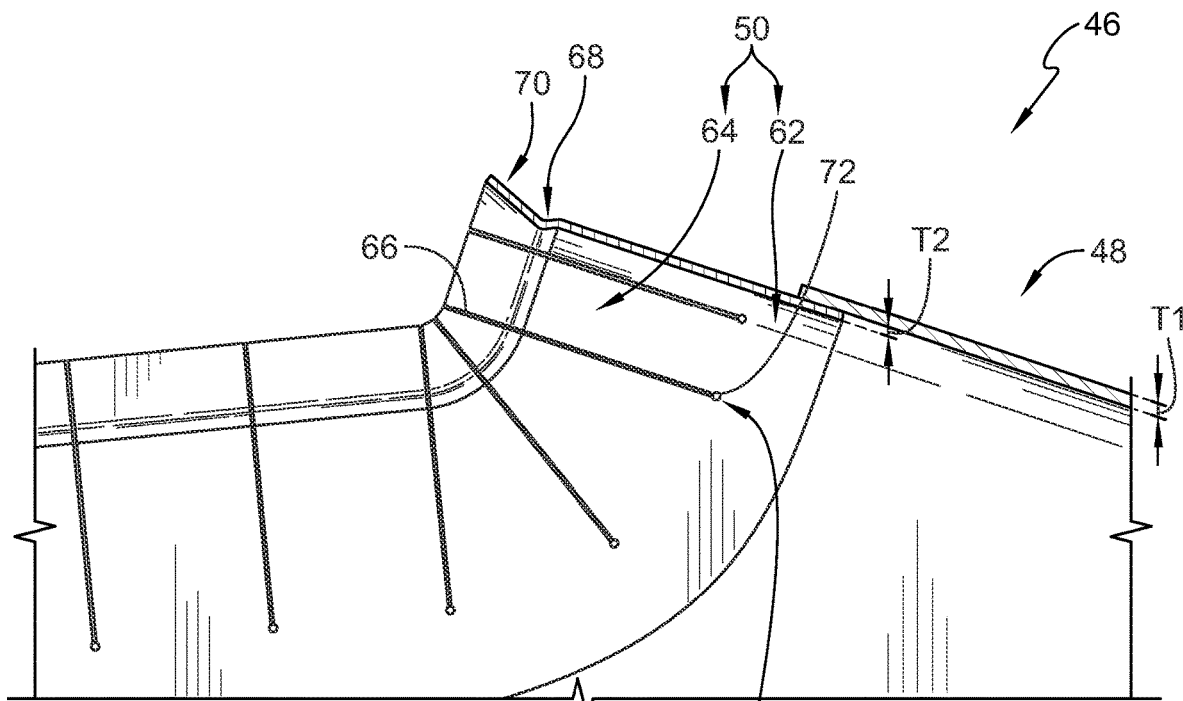
FIG. 5 is a side view of the inlet shroud of FIG. 4 with the inlet cowl removed, showing the continuous band of the compliant joint is fixed to the shroud housing and the plurality of slots are formed in spaced apart relation along the compliant joint.

The compliant joint 50 is made of metallic materials having a second thickness T2 as shown in FIG. 5. The second thickness T2 of the compliant joint 50 is less than the first thickness T1 of the metallic materials of the shroud housing 48. In one embodiment, the compliant joint 50 is brazed to the shroud housing 48. In another embodiment, the compliant joint 50 is welded to the shroud housing 48.

The continuous band 62 of the compliant joint 50 is fixed to the shroud housing 48 as shown in FIGS. 3 and 4. The continuous band 62 extends around the first side wall 52, the second side wall 54, and the outer wall 56 of the shroud housing 48. In other embodiments, the continuous band 62 extends partway along one or more of the first side wall 52, the second side wall 54, and the outer wall 56. The compliant joint 50 may be formed from multiple segments in other embodiments.

The plurality of deflectable tabs 64 are formed by a plurality of slots 66 that extend into the compliant joint 50 toward the continuous band 62 as shown in FIGS. 3 and 5. The plurality of deflectable tabs 64 are configured to elastically deform in response to sliding the compliant joint 50 onto and off of the inlet cowl 25 as the heat-exchanger assembly 26 is separated from the inlet cowl 25 and removed from the bypass duct 20.

The plurality of deflectable tabs 64 allow the compliant joint 50 to remain in contact with the outlet 34 of the inlet cowl 25 such that the seal between the inlet cowl 25 and the heat-exchanger assembly 26 is maintained as shown in FIG. 4. Each of the plurality of deflectable tabs 64 can shift relative to the other plurality of deflectable tabs 64 to maintain contact with and conform to the inlet cowl 25.

The plurality of deflectable tabs 64 also result in frictional damping. The plurality of deflectable tabs 64 dissipate energy produced by vibrations of the inlet cowl 25 and the heat-exchanger assembly 26 through the sliding friction between the inlet cowl 25 and the plurality of deflectable tabs 64. Friction between the plurality of deflectable tabs 64 and the inlet cowl 25 produces damping, which decreases the chance that modes of the heat-exchanger assembly 26 will be excited during operation of the gas turbine engine 10.

Each of the plurality of deflectable tabs 64 is formed to include a protrusion 68 and a flared portion 70 as shown in FIGS. 4 and 5. The protrusion 68 of each of the plurality of deflectable tabs 64 contacts an exterior of the inlet cowl 25 to seal between the inlet cowl 25 and the heat-exchanger assembly 26. The flared portion 70 of each of the plurality of deflectable tabs 64 extends outwardly from the protrusion 68 and in a direction away from the flow path 24.

The protrusion 68 of each of the plurality of deflectable tabs 64 extends inwardly toward the flow path 24 and the inlet cowl 25 as shown in FIG. 4. The protrusion 68 of each of the plurality of deflectable tabs 64 contacts an exterior of the first side wall 36, the second side wall 38, or the outer wall 40 of the inlet cowl 25 such that the compliant joint 50 is located around the exterior of the inlet cowl 25. The protrusion 68 of each of the plurality of deflectable tabs 64 shifts as the plurality of deflectable tabs 64 shift so that each protrusion 68 maintains contact with the exterior of the inlet cowl 25. Maintaining contact between the protrusion 68 of each of the plurality of deflectable tabs 64 and the inlet cowl 25 minimizes leakage of the air 15 out of the flow path 24 between the inlet cowl 25 and the inlet shroud 46.

Because the compliant joint 50 is located around the exterior of the inlet cowl 25, at least a portion of each of the plurality of slots 66 and at least a portion of each of the plurality of deflectable tabs 64 are shielded from the flow path 24 as shown in FIG. 4. Thus, an amount of air 15 that sharply turns and flows out of the plurality of slots 66 is minimized.

Additionally, because the compliant joint 50 is located around the exterior of the inlet cowl 25, as shown in FIG. 4, a forward facing step that faces toward the inlet 32 of the inlet cowl 25 is not formed in the flow path 24. Thus, the air 15 is not subjected to a forward facing step as it flows through the outlet 34 of the inlet cowl 25 and into the inlet shroud 46. If the inlet cowl 25 is located exterior to the compliant joint 50, then the air 15 would flow over a forward facing step, which would negatively impact the flow of the air 15. As such, the engagement of the inlet cowl 25 and the compliant joint 50 of the inlet shroud 46 forms an aft facing step that faces away from the inlet 32 of the inlet cowl 25.

The continuous band 62 of the compliant joint 50 is coupled to the shroud housing 48 so that the shroud housing 48 is located around an exterior of the continuous band 62 as shown in FIG. 4. Thus, a forward facing step is not formed in the flow path 24 at the connection point between the continuous band 62 and the compliant joint 50.

The flared portion 70 of each of the plurality of deflectable tabs 64 is coupled to and extends outwardly from the corresponding protrusion 68 as shown in FIG. 4. The flared portion 70 is located on the compliant joint 50 opposite the continuous band 62. The flared portion 70 of each of the plurality of deflectable tabs 64 extends from the corresponding protrusion 68 at an angle. As such, the flared portion 70 is angled in a direction away from the inlet cowl 25 and the flow path 24. A gap G is formed between the flared portion 70 of each of the plurality of deflectable tabs 64 and the inlet cowl 25 when the inlet shroud 46 is inserted onto the inlet cowl 25 as shown in FIG. 4.

The flared portion 70 of each of the plurality of deflectable tabs 64 allows for potential stack tolerances of the inlet cowl 25 and the heat-exchanger assembly 26. During blind installation of the heat-exchanger assembly 26, the flared portion 70 allows the compliant joint 50 to slide onto the inlet cowl 25 until the protrusion 68 of each of the plurality of deflectable tabs 64 contacts the exterior of the inlet cowl 25.

In the illustrative embodiment, the plurality of slots 66 are formed in spaced apart relation along an entirety of the compliant joint 50 as shown in FIG. 3. In alternative embodiments, the plurality of slots 66 are formed in at least a portion of the compliant joint 50. Each of the plurality of slots 66 has a length that is substantially similar to a length of the other slots of the plurality of slots 66. A hole 72 is formed at an innermost end 74 of each of the plurality of slots 66. The innermost end 74 of each of the plurality of slots 66 is the end of each of the plurality of slots 66 closest to the continuous band 62.

A method of using the bypass duct 20 with the inlet cowl 25 and the heat-exchanger assembly 26 is described below. The method includes providing the bypass duct 20 including the outer wall 19 that defines the outer boundary of the flow path 24 and the inner wall 23 that defines the inner boundary of the flow path 24. The method further includes arranging the inlet cowl 25 in the bypass duct 20. The inlet cowl 25 extends between the forward end 28 thereof and the aft end 30 thereof. The inlet cowl 25 is formed to define the inlet 32 at the forward end 28 and the outlet 34 at the aft end 30. The inlet cowl 25 is coupled to the outer wall 19 of the bypass duct 20 at the forward end 28 of the inlet cowl 25.

The method further includes moving the heat-exchanger assembly 26 into engagement with the inlet cowl 25 within the bypass duct 20. The heat-exchanger assembly 26 includes the heat exchanger 44 and the inlet shroud 46. The inlet shroud 46 includes the shroud housing 48 arranged around the heat exchanger 44 and the compliant joint 50 coupled with the shroud housing 48. Moving the heat-exchanger assembly 26 into engagement with the inlet cowl 25 causes the compliant joint 50 to deflect around the inlet cowl 25 and form the seal between the outlet 34 of the inlet cowl 25 and the compliant joint 50 of the inlet shroud 46 of the heat-exchanger assembly 26.

The compliant joint 50 includes the continuous band 62 and the plurality of deflectable tabs 64 that are formed by the plurality of slots 66 that extend into the compliant joint 50 toward the continuous band 62. The step of moving the heat-exchanger assembly 26 includes sliding the inlet shroud 46 onto the inlet cowl 25 so that the compliant joint 50 contacts the outlet 34 of the inlet cowl 25 and deforming the plurality of deflectable tabs 64 of the compliant joint 50.

The method further includes fixing the access panel 47 to the outer wall 19 of the bypass duct 20. The method further includes removing the access panel 47 from the outer wall 19 of the bypass duct 20. The method further includes moving the heat-exchanger assembly 26 away from the inlet cowl 25 to separate the heat-exchanger assembly 26 from the inlet cowl 25.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising:
a bypass duct configured to direct air through a flow path to provide thrust to propel the gas turbine engine, the bypass duct including an outer wall that defines an outer boundary of the flow path and an inner wall that defines an inner boundary of the flow path,
an inlet cowl located in the bypass duct and configured to collect a portion of the air flowing in the bypass duct, the inlet cowl extending between a forward end thereof and an aft end thereof, the inlet cowl formed to define an inlet at the forward end and an outlet at the aft end, and
a heat-exchanger assembly removably coupled with the inlet cowl and configured to receive the portion of the air from the outlet of the inlet cowl and to transfer heat from the heat-exchanger assembly to the portion of the air to cool a fluid within the heat-exchanger assembly, the heat-exchanger assembly including a heat exchanger and an inlet shroud coupled with the heat exchanger and engaged with the inlet cowl to direct the portion of the air through the heat exchanger, and the inlet shroud includes a shroud housing arranged around the heat exchanger and a compliant joint coupled with the shroud housing and engaged with the inlet cowl along the outlet of the inlet cowl to provide a seal between the inlet cowl and the heat-exchanger assembly,
wherein the compliant joint has a continuous band and a plurality of deflectable tabs that are formed by a plurality of slots that extend into the compliant joint toward the continuous band, the plurality of deflectable tabs are configured to elastically deform in response to sliding the compliant joint onto and off of the inlet cowl to allow the heat-exchanger assembly to be separated from the inlet cowl and removed from the bypass duct.

2. The gas turbine engine of claim 1, wherein the compliant joint is formed to include a protrusion on each of the plurality of deflectable tabs and a flared portion coupled to the protrusion on each of the plurality of deflectable tabs and located opposite the continuous band, the protrusion extending inwardly toward the flow path and the inlet cowl, and the flared portion extending outwardly from the protrusion away from the flow path and the inlet cowl.

3. The gas turbine engine of claim 2, wherein the protrusion on each of the plurality of deflectable tabs contacts the inlet cowl to provide the seal between the inlet cowl and the heat-exchanger assembly.

4. The gas turbine engine of claim 3, wherein the inlet cowl includes a first side wall, a second side wall spaced apart circumferentially from the first side wall, and an outer wall that extends circumferentially between and interconnects the first side wall and the second side wall, the compliant joint extends around the first side wall, the second side wall, and the outer wall of the inlet cowl, and the protrusion on each of the plurality of deflectable tabs contacts the first side wall, the second side wall, and the outer wall.

5. The gas turbine engine of claim 2, wherein a gap is formed between the inlet cowl and the flared portion on each of the plurality of deflectable tabs of the compliant joint.

6. The gas turbine engine of claim 1, wherein the continuous band of the compliant joint is fixed to the shroud housing.

7. The gas turbine engine of claim 1, wherein the compliant joint of the inlet shroud is located around an exterior of the inlet cowl.

8. The gas turbine engine of claim 1, wherein the shroud housing of the inlet shroud includes a first side wall, a second side wall spaced apart circumferentially from the first side wall, and an outer wall that extends circumferentially between and interconnects the first side wall and the second side wall, and the continuous band of the compliant joint extends around the first side wall, the second side wall, and the outer wall of the shroud housing.

9. The gas turbine engine of claim 8, wherein the plurality of slots are formed in spaced apart relation along an entirety of the compliant joint, and each of the plurality of slots has a length that is substantially similar to a length of the other slots of the plurality of slots.

10. The gas turbine engine of claim 1, wherein the heat-exchanger assembly further includes an access panel removably coupled with the outer wall of the bypass duct and the heat exchanger and inlet shroud are coupled with the access panel for movement therewith.

11. The gas turbine engine of claim 1, wherein the inlet cowl is coupled to the outer wall of the bypass duct.

12. The gas turbine engine of claim 1, wherein the compliant joint is at least one of brazed and welded to the shroud housing.

13. The gas turbine engine of claim 1, wherein the inlet shroud is made of metallic materials and a thickness of the metallic materials of the compliant joint is less than a thickness of the metallic materials of the shroud housing.

14. A gas turbine engine comprising:
a first component configured to collect a flow of air, the first component extending between a first end thereof and a second end thereof, the first component formed to define an inlet at the first end and an outlet at the second end, and
a second component removably coupled with the first component and configured to receive the flow of air from the outlet of the first component, the second component includes a shroud housing configured to direct the flow of air through the second component and a compliant joint coupled with the shroud housing and engaged with the first component along the outlet of the first component to provide a seal between the first component and the second component, wherein the shroud housing of the second component includes a first side wall extending between a first end and a second end opposite the first end, a second side wall spaced apart circumferentially from the first side wall and extending between a first end and a second end opposite the first end of the second side wall, and an outer wall that extends circumferentially between and interconnects the second end of the first side wall and the second end of the second side wall, wherein the first end of the first side wall defines a terminal end of the first side wall and the first end of the second side wall defines a terminal end of the second side wall circumferentially spaced apart from the terminal end of the first side wall,
wherein the compliant joint has a continuous band that extends around the first side wall, the second side wall, and the outer wall of the shroud housing and a plurality of deflectable tabs that are formed by a plurality of slots that extend into the compliant joint toward the continuous band, the plurality of deflectable tabs are configured to elastically deform in response to sliding the compliant joint into engagement with the outlet of the first component.

15. The gas turbine engine of claim 14, wherein the continuous band of the compliant joint is coupled to the shroud housing, the compliant joint includes a protrusion formed on each of the plurality of deflectable tabs and a flared portion coupled to the protrusion on each of the plurality of deflectable tabs, the protrusion on each of the plurality of deflectable tabs extending inwardly toward the first component and the flared portion on each of the plurality of deflectable tabs extending outwardly from the protrusion away from the first component, and the protrusion on each of the plurality of deflectable tabs contacts the first component to provide the seal between the first component and the second component, and
wherein the first component is located radially inward of the plurality of deflectable tabs of the compliant joint, and the continuous band of the compliant joint is located radially inward of the shroud housing.

16. The gas turbine engine of claim 15, wherein the first component includes a first side wall, a second side wall spaced apart circumferentially from the first side wall, and an outer wall that extends circumferentially between and interconnects the first side wall and the second side wall, the compliant joint extends around the first side wall, the second side wall, and the outer wall of the first component, and the protrusion on each of the plurality of deflectable tabs contacts the first side wall, the second side wall, and the outer wall of the first component.

17. The gas turbine engine of claim 15, wherein a gap is formed between the first component and the flared portion on each of the plurality of deflectable tabs of the compliant joint.

18. A method comprising:
providing a bypass duct including an outer wall that defines an outer boundary of a flow path and an inner wall that defines an inner boundary of the flow path,
arranging an inlet cowl in the bypass duct, the inlet cowl extending between a forward end thereof and an aft end thereof, the inlet cowl formed to define an inlet at the forward end and an outlet at the aft end, and
moving a heat-exchanger assembly into engagement with the inlet cowl, the heat-exchanger assembly including a heat exchanger and an inlet shroud that includes a shroud housing arranged around the heat exchanger and a compliant joint coupled with the shroud housing, wherein moving the heat-exchanger assembly into engagement with the inlet cowl causes the compliant joint to deflect around the inlet cowl and form a seal between the outlet of the inlet cowl and the compliant joint of the inlet shroud of the heat-exchanger assembly.

19. The method of claim 18, further including moving the heat-exchanger assembly away from the inlet cowl to separate the heat-exchanger assembly from the inlet cowl.

20. The method of claim 18, wherein the compliant joint includes a continuous band and a plurality of deflectable tabs that are formed by a plurality of slots that extend into the compliant joint toward the continuous band, and the moving the heat-exchanger assembly step includes sliding the inlet shroud onto the inlet cowl so that the compliant joint contacts the outlet of the inlet cowl and deforming the plurality of deflectable tabs of the compliant joint.

\* \* \* \* \*